United States Patent
Chang

(10) Patent No.: US 10,872,575 B2
(45) Date of Patent: Dec. 22, 2020

(54) DISPLAY DEVICE

(71) Applicant: E Ink Holdings Inc., Hsinchu (TW)

(72) Inventor: Jen-Yu Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/371,112

(22) Filed: Apr. 1, 2019

(65) Prior Publication Data

US 2019/0362680 A1     Nov. 28, 2019

(30) Foreign Application Priority Data

May 25, 2018    (TW) ............... 107118015 A

(51) Int. Cl.
     *G09G 3/34*      (2006.01)
     *G02F 1/167*      (2019.01)

(52) U.S. Cl.
     CPC ............. *G09G 3/344* (2013.01); *G02F 1/167* (2013.01); *G09G 2320/041* (2013.01)

(58) Field of Classification Search
     CPC ........ G09G 3/344; G09G 3/38; G09G 3/3648; G09G 2380/08; G09G 2300/0426; G09G 2310/068; G09G 3/34
     See application file for complete search history.

(56) References Cited

U.S. PATENT DOCUMENTS

| | | | |
|---|---|---|---|
| 8,970,562 B2 * | 3/2015 | Xu | ......................... G06F 1/206 345/204 |
| 9,000,932 B2 | 4/2015 | Wang et al. | |
| 9,767,739 B2 | 9/2017 | Zhang et al. | |
| 9,805,676 B2 | 10/2017 | Koyama et al. | |
| 10,311,808 B1 * | 6/2019 | Richards | ................. G06F 1/163 |
| 2005/0122305 A1 * | 6/2005 | Murao | .............. G02F 1/133382 345/101 |
| 2006/0284794 A1 * | 12/2006 | Johnson | ............... G09G 3/3446 345/58 |
| 2007/0052665 A1 * | 3/2007 | Zhou | ...................... G09G 3/344 345/107 |
| 2007/0057905 A1 * | 3/2007 | Johnson | ................. G09G 3/344 345/107 |

(Continued)

FOREIGN PATENT DOCUMENTS

| | | |
|---|---|---|
| CN | 1920505 A | 2/2007 |
| CN | 105931596 A | 9/2016 |

(Continued)

OTHER PUBLICATIONS

Corresponding Taiwan office action dated Jul. 31, 2019.

(Continued)

*Primary Examiner* — Olga V Merkoulova
(74) *Attorney, Agent, or Firm* — CKC & Partners Co., LLC

(57) ABSTRACT

A display device includes a processor and a display panel. The processor is configured to output multiple display signals. The display panel includes multiple display units and multiple temperature sensors. The display units are electrically coupled to the processor and configured to receive the multiple display signals to provide a display screen. The temperature sensors are electrical coupled to the processor and configured to detect the temperature of different areas of the display panel so as to transmit multiple detection signals to the processor so that the processor adjusts at least one of the display signals.

10 Claims, 5 Drawing Sheets

(56) References Cited

U.S. PATENT DOCUMENTS

| | | | | |
|---|---|---|---|---|
| 2007/0205978 A1* | 9/2007 | Zhou | G09G 3/344 | 345/107 |
| 2007/0206262 A1* | 9/2007 | Zhou | G09G 5/14 | 359/267 |
| 2007/0229443 A1* | 10/2007 | Sawada | G09G 3/3611 | 345/101 |
| 2008/0074407 A1* | 3/2008 | Zhou | G09G 3/20 | 345/204 |
| 2010/0201677 A1* | 8/2010 | Takei | G09G 3/344 | 345/213 |
| 2014/0071383 A1* | 3/2014 | Drolet | G02F 1/13306 | 349/72 |
| 2016/0026061 A1* | 1/2016 | O'Keeffe | G02F 1/13392 | 359/296 |
| 2016/0155384 A1* | 6/2016 | Kim | G09G 3/3258 | 345/212 |
| 2016/0351097 A1* | 12/2016 | Sato | G09G 3/344 | |
| 2017/0236497 A1* | 8/2017 | Huitema | G04G 9/007 | 345/173 |
| 2018/0330669 A1* | 11/2018 | Zheng | G09G 3/3258 | |

FOREIGN PATENT DOCUMENTS

| | | |
|---|---|---|
| TW | 200421246 A | 10/2004 |
| TW | 201218169 A | 5/2012 |
| TW | 201614631 A | 4/2016 |
| TW | 201812731 A | 4/2018 |

OTHER PUBLICATIONS

Corresponding Taiwan office action dated Apr. 23, 2019.

Texas Instruments, "TPS651851 PMIC for E Ink® Vizplex™ Enabled Electronic Paper Display", SLVSDV0—Nov. 2016.

Seiko Epson Corporation, "S1D13522 Epson / E Ink EPD Controller, Hardware Functional Specification", 2009.

Julian Yang, "CMOS Temperature Sensor and Bandgap Voltage Reference", a thesis submitted to Institute and Department of Electrophysics, National Chiao Tung University, Jul. 2004.

* cited by examiner

DISPLAY DEVICE

CROSS-REFERENCE TO RELATED APPLICATION

This application claims priority to Taiwan Application Serial Number 107118015, filed May 25, 2018, which is herein incorporated by reference in its entirety.

BACKGROUND

Technical Field

The present disclosure relates to a display device. More particularly, it relates to a display device capable of instantly detecting temperature.

Description of Related Art

When various equipment such as smart phones, smart wearable devices, and large-size display panels in operation, the display device of these equipment will produce temperature changes. For example, the display principle of the electronic paper is to generate an electric field for the electrophoretic liquid through the electrodes, so that charged particles of different colors can move in the electrophoretic liquid, thereby generating a display screen. Since the moving speed of the charged particles is related to the temperature of the electrophoretic fluid, if the display device does not immediately adjust the internal parameters according to the temperature change, it will easily cause image sticking or various undesirable phenomena on the display screen. Similarly, other types of display devices (such as liquid crystal) have the same problem.

SUMMARY

One aspect of the present disclosure is a display device. The display device comprises a processor and a display panel. The processor is configured to output a plurality of display signals. The display panel comprises multiple display units and multiple temperature sensors. The display units are electrically coupled to the processor and configured to receive the display signals so as to provide a display screen. The temperature sensors are electrically coupled to the processor. The temperature sensors are configured to detect a temperature of different areas in the display panel, and transmit multiple detection signals to the processor accordingly, so that the processor adjusts at least one of the display signals according to at least one of the detection signals.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
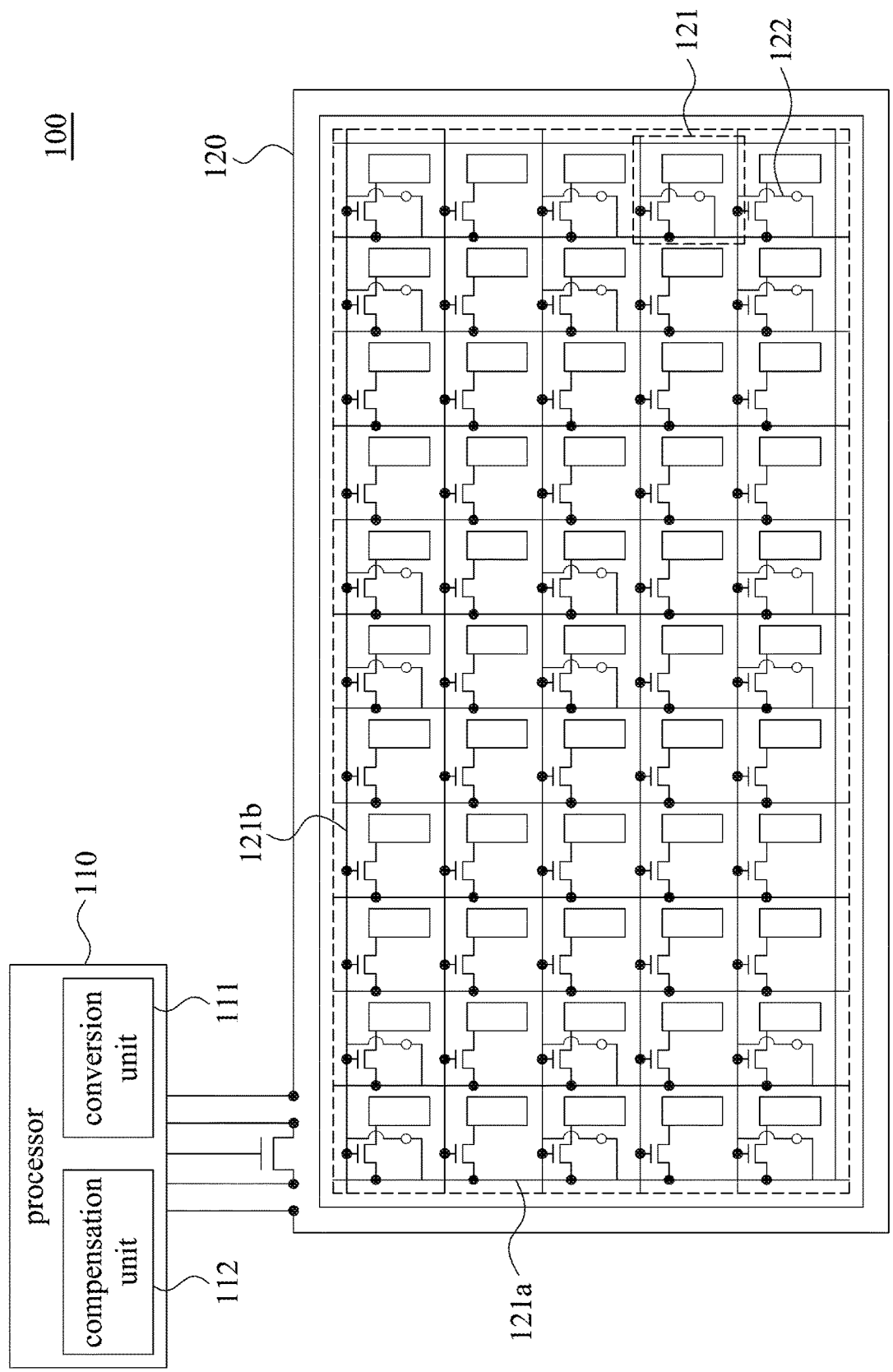
FIG. 1 is a schematic diagram of a display device in some embodiments of the present disclosure.
Figure 2:
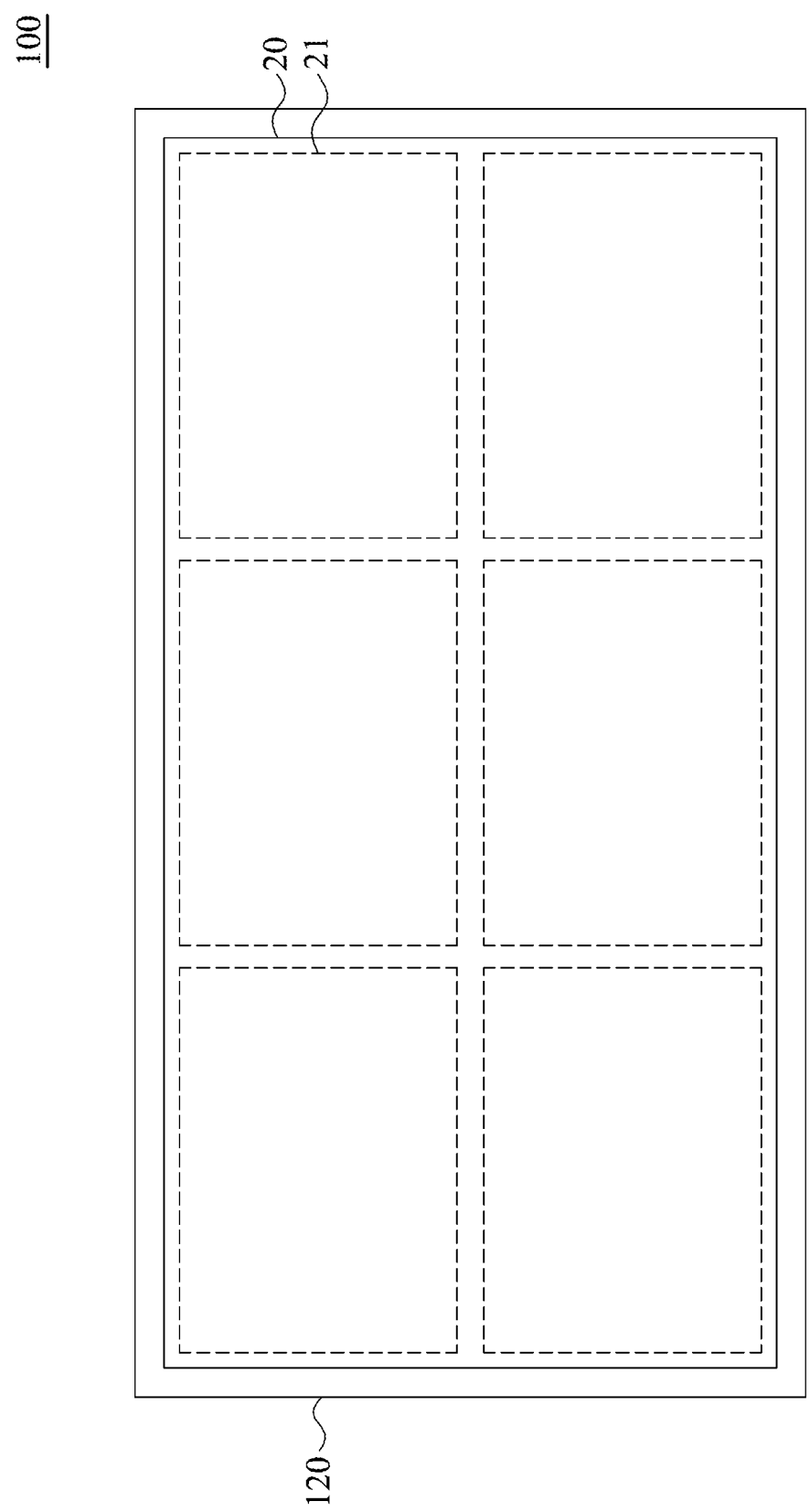
FIG. 2 is a schematic diagram of a display panel in some embodiments of the present disclosure.

Please refer to FIG. 1 and FIG. 2. FIG. 1 and FIG. 2 are schematic diagrams of a display device and a display panel in some embodiments of the present disclosure. As shown in FIG. 1, the display device 100 includes a processor 110 and a display panel 120. The processor 110 is configured to generate multiple display signals. In some embodiments, the processor 110 includes a conversion unit 111 and a compensation unit 112. In some embodiments, the display signals may be driving voltages/currents for controlling the liquid crystal display, or driving voltages/currents for controlling the electrodes in the electronic paper, but not limited thereto.

Structurally, the processor 110 is electrically coupled to the display panel 120. As shown in FIG. 1, in some embodiments, the display panel 120 includes multiple display units 121 and multiple temperature sensors 122. Structurally, the display units 121 are electrically coupled to the processor 110 to receive display signals from the processor 110 in order to generate the display screen 20 shown in FIG. 2.

Please refer to FIG. 2. In some embodiments, as shown in FIG. 2, the display screen 20 of the display panel 120 includes multiple display areas 21, and positions of temperature sensors 122 respectively corresponds to the different display areas 21 in the display panel 120. In other words, there will be at least one temperature sensor 122 in each display area 21.

Please refer to FIG. 1 again. In some embodiments, each display unit 121 is configured to display an image of each pixel according to display signals. The display units 121 may be a liquid crystal cell, or a pixel electrode and an electronic ink in an electronic paper. In some embodiments, each display unit 121 contain at least one pixel electrode respectively. The display panel 120 further includes multiple data lines 121a and multiple scan lines 121b. The pixel electrode receives display signals from the processor 110 through the data line 121a and the scan line 121b to display the corresponding brightness or color.

The temperature sensors 122 are electrically coupled to the processor 110 for detecting temperatures of different areas (for example, display areas 21) in the display panel 120. The temperature sensors 122 transmit multiple detection signals to the processor 110 according to the detection result, in order that the processor 110 adjusts the intensity or frequency of at least one display signal according to at least one detection signal. Accordingly, it can be ensured that the screen displayed by the display device 100 will not be distorted by the temperature change of the display units 121. Since the temperature sensors 122 are arranged inside the display panel 120 instead of the outside of the display panel 120, the actual temperature of the display panel 120 can be accurately detected. In addition, the temperature sensors 122 are arranged in the display panel 120, so that the actual temperature of each display area 21 can be detected, and the processor 110 can accurately adjust display signals.

Figure 3:
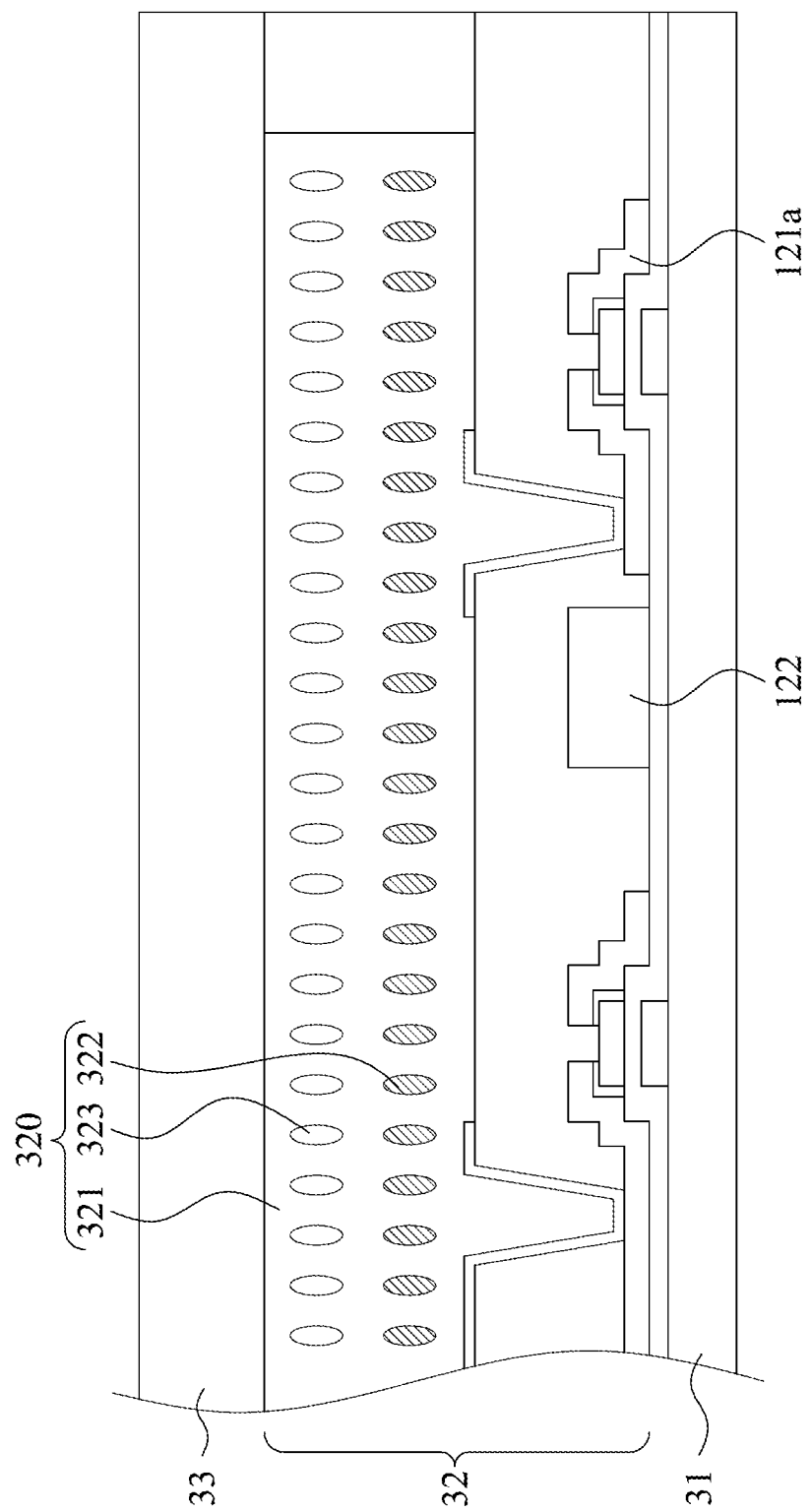
FIG. 3 is a schematic diagram of a display panel in some embodiments of the present disclosure.

In some embodiments, the temperature sensors 122 regularly detect detection signals. After receiving the detection signals from the temperature sensors 122, the processor 110 first finds the display areas 21 corresponding to each detection signal. Then, according to the detection signals, the processor 110 adjusts the display signals corresponding to the display areas 21. Finally, the processor 110 transmits the adjusted display signals to the display units 121 arranged in the corresponding display areas 123. Please refer to FIG. 3, FIG. 3 is a partial sectional drawing of the display panel 120. As shown in FIG. 3, in some embodiments, the display panel 120 further includes a substrate 31, an ink layer 32, and a protective layer 33. The display units 121 and the temperature sensors 122 are respectively arranged on a side of the substrate 31 corresponding to the ink layer 32. The ink layer 32 includes a display medium 320. The substrate 31 is arranged on the first side of the ink layer 32 (e.g., the bottom side). The protective layer 33 is arranged on the second side of the ink layer 32 (e.g., the top side). In some embodiments, the display medium 320 includes an electrophoretic fluid 321, multiple colored charged particles 322 (e.g., black charged particles), and multiple white charged particles 323. The white charging particles 323 and colored charged particles 322 are distributed in the electrophoretic fluid 321. According to the electric field generated by the display units 121, the white charging particles 323 and the colored charged particles 322 will move toward the display units 121 or away from the display units 121. Accordingly, the display units 121 can display the image of each pixel by controlling the movement of the white charged particles 323 and the colored charged particles 322 according to the display signals.

As shown in FIG. 3, in some embodiments, the temperature sensors 122 may be fabricated and integrated on the substrate 31 when the display panel 120 is manufactured. For example, the temperature sensors 122 may be formed on the substrate 31 along with the scan line 121b. The temperature sensors 122 may be disposed on the substrate 31 between the scan lines 121b or the display units 121, and may be configured to detect a detection voltage or a detection current in the display panel 120, so as to generate detection signals.

In some embodiments, the temperature sensor 122 may be a current sensing resistor or a thermal resistor, but the present disclosure is not limited thereto.

Figure 4:
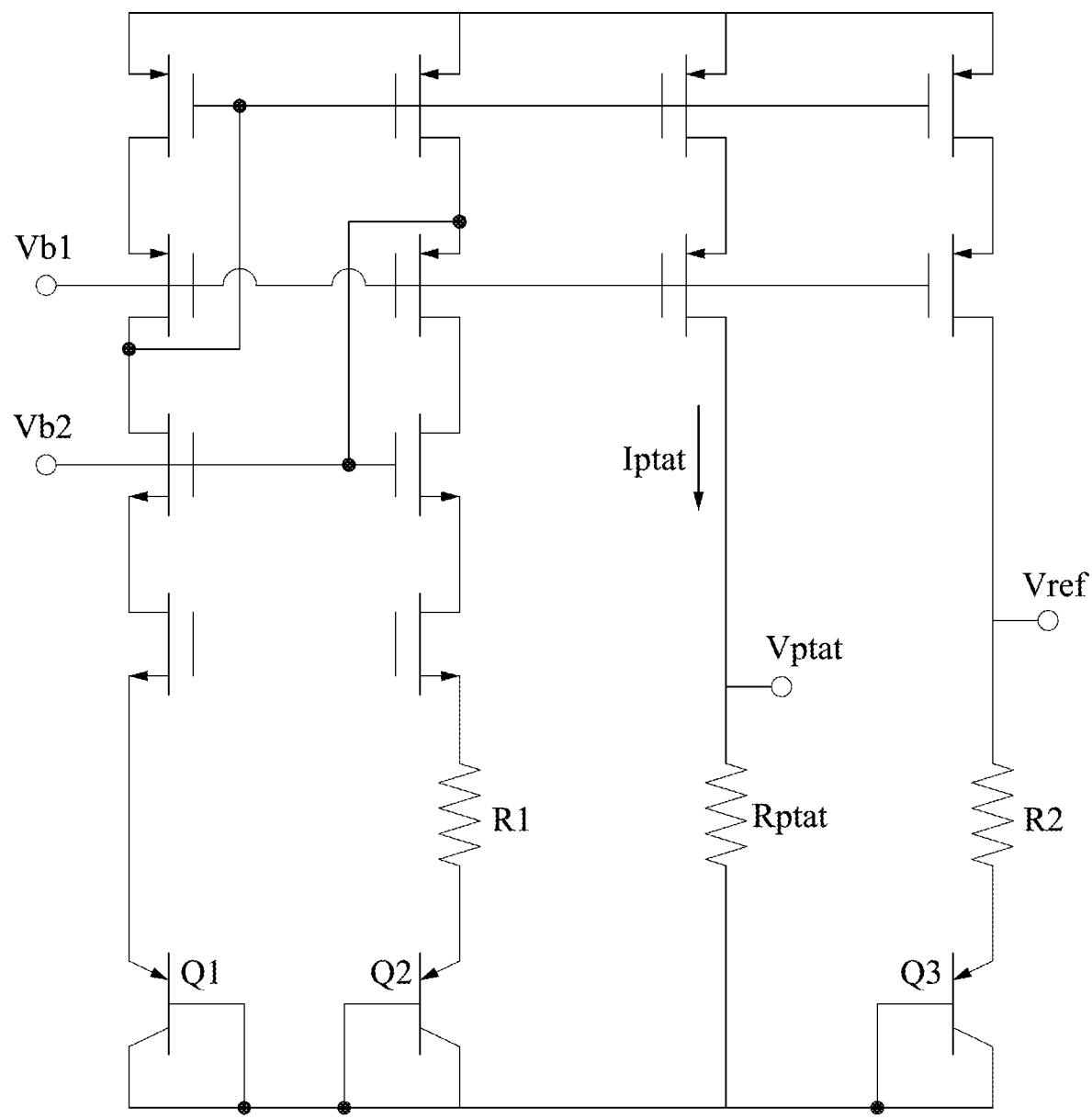
FIG. 4 is a schematic diagram of a temperature sensor in some embodiments of the present disclosure.

Please refer to FIG. 4. As shown in FIG. 4, in other embodiments, the temperature sensors 122 are configured to detect the potential difference between the two input terminals Vb1, Vb2 in the display panel 120. The input terminals Vb1 and Vb2 are electrically coupled to the data line 121a and the scan line 121b shown in FIG. 1, respectively. The temperature sensors 122 further include multiple resistors R1, R2, Rptat and switching elements Q1-Q3 for detecting the detection current Iptat according to the potential difference between the input terminals Vb1, Vb2.

As shown in FIG. 4, structurally, the resistor R1 is connected in series with the switching element Q2, and the resistor R2 is connected in series with the switching element Q3. The resistor R1 and the switching element Q2, the resistor Rptat, the resistor R2, and the switching element Q3 respectively form a series branch. In other embodiments, the temperature sensors 122 are configured to detect a detection potential difference between a reference point Vref and a detection point Vptat. The above detection signals may be the detection current Iptat or a detection potential difference between the reference points Vref and Vptat so as to confirm the current temperature of display areas 21.

Figure 5:
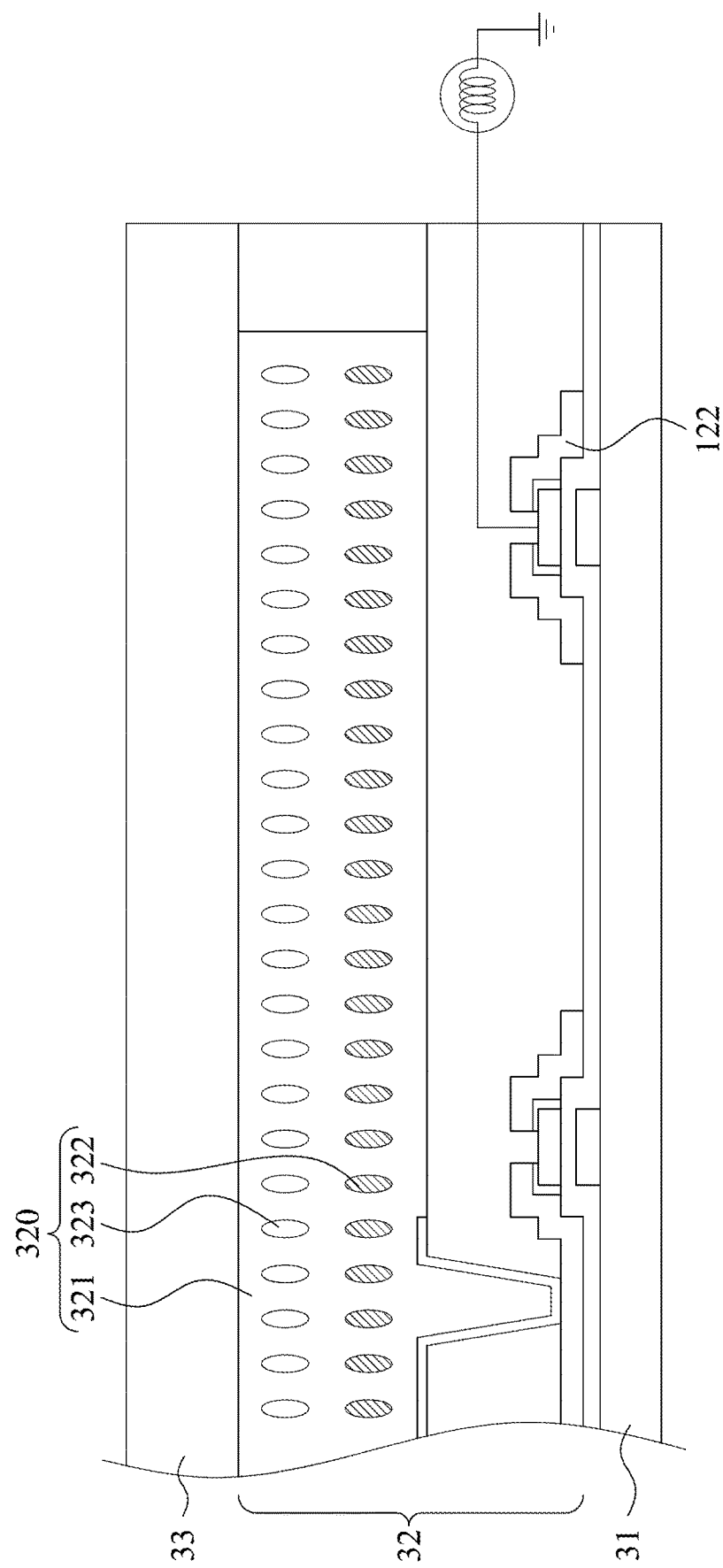
FIG. 5 is a schematic diagram of a display panel in some embodiments of the present disclosure.

Referring to FIG. 5, in other embodiments, the temperature sensor 122 may be a switching transistor for detecting a detection voltage or a detection current in the display panel 120. The switching transistor, as the temperature sensors 122, can be fabricated on the substrate 31 with other switching transistors, which is configured to drive the pixel electrode, in the display units 121 when the display panel 120 is manufactured so as to simplify the process.

Please refer to FIG. 1 to FIG. 4. In some embodiments, after the temperature sensors 122 detect the current value of the detection current Iptat, the detection signals are transmitted to the processor 110, so that the processor 110 can determine the temperature value. In some embodiments, a conversion unit 111 in the processor 110 is configured to convert the current value of the detection current Iptat from analog to digital, so that the processor 110 can accurately calculate the temperature value corresponding to the detection signal.

In some embodiments, when the processor 110 determines that any one of the detection signals exceeds a threshold value, the processor 110 is configured to adjust the display signals, which corresponding to the display units 121 in the corresponding display area 21 according to the detection signals. In some embodiments, the processor 110 determines whether the detection current Iptat or the detection potential difference exceeds the threshold value. In other embodiments, the processor 110 may also determine whether the temperature corresponding to the detection current Iptat exceeds the threshold value.

In some embodiments, the display signals are configured to drive the display units 121 to generate an electric field in the display medium 320. the processor is configured to adjust a duration that the display units 121 generates the electric field according to the detection signals. For example, since the speed of the movement of the white charging particles 323 and the colored charged particles 322 (for example, black) in the electrophoretic fluid 321 is proportional to the temperature, when the processor 110 determines that the temperature of the display areas 21 is higher than the threshold value according to the detection signals, the processor 110 can reduce the driving time of the display units 121 and avoid the color distortion problem of the pixels of the display units 121. Similarly, when the processor 110 determines that the temperature of the display areas 21 is lower than the threshold value according to the detection signals, the processor 110 can increase the driving time of the display units 121.

In some embodiments, the compensation unit 112 in the processor 110 is configured to calculate the compensation data based on the detection signals, so that the processor 110 adjusts the display signals according to the compensation data. In other embodiments, the compensation unit 112 has a compensation formula or stores a compensation data base.

Therefore, the compensation unit 112 can calculate a adjustment value of the display signals according to the detection signals, or find the adjustment value corresponding to the detection signals according to the compensation data base. For example, if the processor 110 determines that the temperature of the display areas 21 is 35 degrees Celsius, and the expected color displayed by the display areas 21 is "gray scale 95", the processor 110 can find the driving time or driving voltage value required for the display unit 121 to display a "gray scale 95" at 35 degrees Celsius in the compensation data base.

In addition, in some embodiments, the processor 110 is configured to periodically output display signals to the display units 121 in an update period to update the display screen 20. There is an idle period between adjacent update periods. In the idle period, the processor 110 receives the detection signals output from the temperature sensors 122. For example, the processor 110 transmits display signals to the display units 121 through the data line 121a and the scan line 121b every 20 milliseconds to update the display screen 20. In 20 milliseconds of the idle period, the temperature sensors 122 transmit the detection signals to the processor 110, so that the processor 110 determines whether the detection signals match the threshold value, and adjusts the display signals accordingly.

As described in the foregoing embodiments of the present disclosure, since the processor 110 determines the temperature of different display areas 21 on the display screen 20 displayed on the display panel 120 according to detection signals transmitted from temperature sensors 122, the processor 110 can immediately adjust the corresponding display signals for each display area 21 to compensate according to the temperature change. According to this, the display screen 20 can be prevented from generating afterimages, uneven brightness, or various undesirable phenomena. In addition, since the temperature sensors 122 are directly fabricated on the substrate 31 of the display panel 120, the detection signals detected by the temperature sensors 122 can accurately record the actual temperature of each display area, thereby improving the accuracy of the compensation.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A display device, comprising:
   a processor configured to output a plurality of display signals; and
   a display panel, comprising:
   an ink layer comprising a display medium, wherein the display medium comprises an electrophoretic fluid with a plurality of colored charged particles;
   a plurality of display units electrically coupled to the processor and configured to receive the plurality of display signals so as to provide a display screen; and
   a plurality of temperature sensors electrically coupled to the processor, wherein the plurality of temperature sensors are configured to detect temperatures of display areas in the display panel, and transmit a plurality of detection signals to the processor in an idle period accordingly,
   wherein the processor adjusts at least one of the plurality of display signals according to at least one of the plurality of detection signals,
   wherein the processor is configured to adjust a duration time of electric field generated by the plurality of display units for driving the plurality of colored charged particles in an update period following the idle period according to the plurality of detection signals,
   wherein when the processor determines that temperature of the display areas indicated by the plurality of detection signals is higher than a threshold value, the processor reduces the duration time of electric field generated by the plurality of display units in the update period for driving the plurality of colored charged particles, and
   when the processor determines that temperature of the display areas indicated by the plurality of detection signals is lower than a threshold value, the processor increase the duration time of electric field generated by the plurality of display units in the update period for driving the plurality of colored charged particles.

2. The display device of claim 1, wherein the display panel comprises:
   a substrate, the plurality of display units and the plurality of temperature sensors arranged on the substrate, wherein each of the plurality of display units comprises a pixel electrode respectively; and
   a protective layer, wherein the substrate is arranged on a first side of the ink layer and the protective layer arranged on a second side of the ink layer.

3. The display device of claim 2, wherein the plurality of the temperature sensors are arranged on a side of the substrate corresponding to the ink layer.

4. The display device of claim 2, wherein the plurality of display signals are configured to drive the plurality of display units.

5. The display device of claim 4, wherein the a plurality of colored charged particles includes a plurality of black charged particles and a plurality of white charged particles.

6. The display device of claim 1, wherein the plurality of temperature sensors are configured to detect a detection current of the display panel and generate the plurality of detection signals accordingly.

7. The display device of claim 6, wherein the processor comprises a conversion unit, the conversion unit is configured to convert the detection current from analog to digital.

8. The display device of claim 1, wherein the processor comprises a compensation unit, the compensation unit is configured to calculate a compensation data according to the at least one of the plurality of detection signals and adjusts the at least one of the plurality of display signals according to the compensation data.

9. The display device of claim 1, wherein the processor is configured to periodically output the plurality of display signals to the plurality of display units to update the display screen in an update period, and the processor is configured to receive the plurality of detection signals outputted by the plurality of temperature sensors in an idle period adjacent to the update period.

10. The display device of claim 1, wherein the temperature sensor is a current sensing resistor, a thermal resistor or a switching transistor.

* * * * *